3,341,293
PREPARATION OF FLUORO COMPOUNDS

Abe F. Maxwell, Durham, N.C., and Donald H. Kelly, Gladstone, and Bernard Sukornick, Elizabeth, N.J., assignors to Allied Chemical Corporation, New York, N.Y., a corporation of New York
No Drawing. Filed Apr. 26, 1963, Ser. No. 276,105
6 Claims. (Cl. 23—203)

This invention relates to processes for making trifluoroamine oxide, $F_3NO$, normally a colorless gas having a boiling point of about minus 89° C. and a melting point of about minus 161° C. $F_3NO$, a known compound, provides a missile ingredient, a powerful high energy oxidizer for missile fuels, and an intermediate for preparation of other high energy propellant oxidizers. Trifluoroamine oxide is further useful to lower substantially the freezing point of the known $N_2O_4$ oxidizer and correspondingly increases the utility range of $N_2O_4$.

Major objectives of the invention are to provide processes for making $F_3NO$ in substantially higher yields than heretofore, and to afford processes which may be carried out in relatively short reaction time and involve use of only readily available compounds as starting materials.

It has been found that when nitrosyl fluoride and elemental fluorine are brought together, under certain conditions of elevated temperature and super-atmospheric pressure, trifluoroamine oxide is produced in recoverable form and in notably high yields. The invention includes the discovery mainly of certain elevated temperature and pressure reaction conditions which cause reaction of nitrosyl fluoride and elemental fluorine to synthesize trifluoroamine oxide in high yields.

In general, practice of the invention comprises heating nitrosyl fluoride and elemental fluorine, in a reaction zone, at temperatures not less than about 150° C. and while at pressure not less than about 2000 p.s.i.g. Stoichiometric aspects of the invention processes appear to be represented by

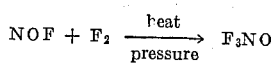

$$NOF + F_2 \xrightarrow[\text{pressure}]{\text{heat}} F_3NO$$

Both raw materials are readily available. The elemental fluorine employed should be substantially free of HF, since the latter appears to be a reaction inhibitor. Nitrosyl fluoride, NOF, is a known commercially available compound, normally a colorless gas having a boiling point of about minus 56° C. and a melting point of about minus 134° C. In practice of the herein processes, commercial NOF and fluorine may be employed. NOF utilized should be substantially free of $N_2O$ and $NO_2$. The NOF charged to the reaction zone may be made by reaction, at substantially room temperature or a little above, of fluorine and nitric oxide (NO) in proportions of substantially 1 mol of fluorine per 2 mols of nitric oxide.

Reactions may be carried out in any suitable, preferably bomb type reactor which may be made of nickel or Monel or other material inert to reactants and products. The reactor preferably should be adaptable for subjection to low temperature refrigeration and also to moderately high temperature external heating. The reactor may be provided with a pressure gauge, and valved openings which selectively facilitate evacuation, charging with gaseous NOF and gaseous fluorine, pressurizing of reactor contents with an inert gas such as nitrogen, argon, and helium, sealing, and discharge of gaseous contents.

At the start of operation, the contents of the reactor preferably consist of the desired proportions of NOF and elemental fluorine reactants, whether in solid, solid-liquid, liquid, or gaseous form, plus an inert pressurizing gas. While desired proportions of NOF and elemental fluorine reactants and desired quantity of inert pressurizing gas may be charged into the reactor in any suitable way, it is preferred, for operational convenience, to effect reactant charging and preliminary pressurizing of reactants at low temperatures, e.g. advantageously at the minus 196° C. temperature of a liquid nitrogen bath. At minus 196° C., NOF is a solid and elemental fluorine is a liquid with possibly some vapor pressure. The NOF and elemental fluorine, whether initially available as gases or liquids, are most conveniently introduced into the reactor by condensing the utilized quantities of reactants into the reactor while the latter is held at about minus 196° C.

Procedurally, convenient practice of the invention processes may be as follows. The reactor may be evacuated to pressure of e.g. less than 10 mm. of Hg, and cooled down to about minus 196° C. by immersion in a liquid nitrogen bath. The desired quantities of NOF and elemental fluorine reactants, both normally available as gases, may be introduced into the reactor separately or concurrently. On completion of reactant charging, the reactor contents may be preliminarily pressurized by pressure introduction into the reactor of inert gas, usually nitrogen. Preliminary pressurizing may be anywhere in the range of e.g. 100–1500 p.s.i.g., specific preliminary pressurizing being chosen so that during subsequent external heating of the reactor to the reaction temperatures, the desired pressure to be maintained during heating is developed in the reactor. Subsequent to preliminary pressurizing, the reactor may be externally heated to bring up the reactor contents to reaction temperatures. On completion of reaction and cooling of the reactor to some conveniently handleable temperature, contents of the reactor may be separated and recovered in any suitable manner. However, for operational convenience and ease of disposal of the inert pressurizing gas it is preferred, immediately on completion of the reaction, to quickly quench the reactor and contents to temperature substantially below the respective minus 134° C. and minus 161° C. melting points of NOF and $F_3NO$, such low temperature refrigeration suitably being accomplished by immersion of the reactor and contents in a liquid nitrogen bath. At the indicated low temperature, $F_3NO$ product and any unreacted NOF are solidified, thus facilitating venting from the reactor of inert pressurizing gas which usually carries with it substantially all of any unreacted fluorine. On completion of inert gas venting from the reactor, the latter may be re-sealed and brought up to e.g. room temperature or higher to facilitate separation and recovery of the reactor contents as by condensation and fractional distillation as conventional in this art.

In accordance with the invention it has been found that the dominantly important reaction control conditions are temperature and pressure. Under pressures as herein indicated, reaction appears to threshold at about 150° C. Yields of $F_3NO$ increase as temperatures rise, and to procure reasonably acceptable yields, reaction temperatures of not less than about 275° C. are desirable. At temperatures of the order of 400–425° C., some decomposition is indicated by the presence of small quantities of some unknown compounds in the reaction products, and investigations show that temperatures above about 450° C. are not preferred. Ordinarily, temperatures may lie in the range of about 275–425° C., and in the best embodiments temperatures employed are substantially in the range of 300–400° C.

Pressures, during heating periods effected at temperatures herein stated, may lie in the range of about 2000–7500 p.s.i.g. Better yields appear to be obtained when pressures are not less than the order of 2500–3000 p.s.i.g., and no particular operating advantages appear to be attributable to pressures higher than about 6000 p.s.i.g.

Best results with regard to $F_3NO$ yields have been obtained when operating with pressures substantially in the range of 4000–6000 p.s.i.g.

With regard to molar proportions of fluorine to NOF, theoretical considerations denote molar proportions of about 1:1. Any reactable proportions of fluorine and NOF may be employed. Mol proportions of fluorine to NOF may vary from 0.5 mol of fluorine to one mol of NOF to a large excess of fluorine, e.g. 15–20 mols per mol of NOF. However, too large fluorine excesses appear to afford no particular advantage. Investigations show desirability of use of fluorine and NOF in proportions of not less than about one mol of fluorine per mol of NOF, usually not less than substantially two mols of fluorine per mol of NOF, and in the better embodiments it is preferred to charge to the reaction zone fluorine and NOF in proportions of substantially 2–6 mols of fluorine per mol of NOF.

Reaction time, i.e. time interval during which the NOF and elemental fluorine reactants are held at the temperatures and pressures indicated, is substantially variable. Investigations show that the reaction is reasonably rapid and, as demonstrated in appended Examples 4 and 5, notably good yields are obtained with a reaction time of as little as 5 minutes or less. Reaction time may vary in accordance with operational variables such as size of the reactor and particular temperatures, pressures, and mol ratios of reactants employed. For any given set of operating conditions, optimum reaction time may be determined by test runs.

On completion of reaction, venting of inert pressurizing gas, and bringing the reactor and contents up to about room temperature or higher to facilitate reactor discharge, the material in the reaction zone comprises the sought-for $F_3NO$, usually some unreacted NOF, and possibly a small amount of fluorine. To effect recovery of trifluoroamine oxide product, a valved outlet of the reactor may be connected thru two cold traps connected in series to a source of high vacuum e.g. less than 1 mm. of Hg. The cold trap adjacent to the reactor outlet may be refrigerated, as by a Dry Ice-acetone mixture, to a temperature e.g. minus 70° C. low enough to condense out NOF (B.P. minus 56° C.), and the second trap may be refrigerated by liquid oxygen down to temperature of about minus 183° C. to condense out $F_3NO$, B.P. minus 89° C. at atmospheric pressure. On low pressure evacuation of the reaction zone, the NOF content of the gas exiting the reactor may be condensed out and separated from the gas stream in the first trap, and sought-for $F_3NO$ condensed out in the second trap from which may be vented any unreacted fluorine. Trifluoroamine oxide may be recovered from the second cold trap, and purified if desired by redistillation.

The following examples illustrates practice of the invention. In all examples the reaction vessel used was a bomb type reactor made of nickel. The reactor was provided with a pressure gauge, and valved openings which facilitated, in the alternative, evacuation, charging with gaseous NOF and gaseous fluorine, pressurizing of reactor contents with nitrogen gas, sealing, and discharge of gaseous contents. The NOF employed in all examples was prepared by reacting fluorine and nitric oxide (NO) in approximately 1:2 mol ratio at about room temperature. Product analyses were made by infrared spectra. After $F_3NO$ was separated by freezing out in the minus 183° C. trap, and small amounts of impurities, mostly fluorine and nitrogen, were pumped off, the volume of the $F_3NO$, under standard conditions of temperature and pressure, was measured to determine $F_3NO$, on the basis of the NOF charged.

*Example 1.*—The reactor was evacuated to pressure of about 2–5 mm. of Hg, and cooled down to about minus 196° C. by immersion in a liquid nitrogen bath. About 500 cc. of NOF gas at pressure of about 760 mm. of Hg (about 22.4 mmols) were charged into and condensed to solid form in the reactor. About 2500 cc. of elemental fluorine at pressure of about 760 mm. of Hg (about 112 mmols) were charged into and condensed in liquid form in the reactor. Fluorine to NOF mol ratio was about 5:1. The reactor was pressurized with nitrogen gas to about 1150 p.s.i.g., and then heated to temperature of about 350° C. which was held for about 1 hr. during which time pressure of about 4950 p.s.i.g. was developed and maintained. The reactor was then quenched quickly to temperature of about minus 196° C. Quenching time was short and such that $F_3NO$ product and any unreacted NOF were solidified without any signflcant liquefaction of nitrogen or any unreacted fluorine which may have been in the reactor. Nitrogen gas was vented along with any unreacted fluorine. The reactor was then sealed, and after heating to about 25° C., the gaseous contents thereof were withdrawn from the reactor and subjected to analysis. Infrared spectra of the product gases showed $F_3NO$ and not much more than trace amounts of NOF. Fractional distillation of product gases resulted in the recovery of less than 1% of NOF, the remainder consisting of $F_3NO$, and less than 1% of fluorine. Yield of $F_3NO$ was thus better than about 97–98%.

In the following examples, procedural techniques were substantially the same as in Example 1, and the runs carried out are summarized below. Yield denotes yield of $F_3NO$ based on the mols of the NOF charged.

| Ex. | Nitrogen Pressure (p.s.i.g.) at −196° C. | Pressure (p.s.i.g.) During Heating | Heating Temp., ° C. | Heating Time., Min. | Ratio F2:NOF | Approx. F3NO, Yield Percent |
|---|---|---|---|---|---|---|
| 2 | 1,100 | 6,000 | 350 | 60 | 1:1 | 35 |
| 3 | 800 | 5,000 | 350 | 60 | 1:2 | 20 |
| 4 | 1,200 | 5,300 | 350 | 5 | 2:1 | 80 |
| 5 | 1,150 | 5,500 | 350 | 5 | 1:1 | 42 |
| 6 | (*) | *3,900 | 200 | 30 | 15:1 | 00 |
| 7 | 1,200 | 3,000 | 300 | 60 | 15:1 | 45 |
| 8 | 1,200 | 4,000 | 400 | 60 | 15:1 | 33 |
| 9 | 1,200 | 4,000 | 350 | 60 | 15:1 | 50 |
| 10 | 400 | 3,250 | 400 | 10 | 1:1 | 15 |
| 11 | 300 | 2,350 | 400 | 10 | 1:1 | 5 |

* Pressure developed by excess fluorine.

In Examples 4 and 5, total time for bringing the reactor and contents from room temeprature to 350° C. and to quenching was about 15 minutes, and time during which reaction temperature was at 350° C. was not more than 5 minutes.

The compound trifluoroamine oxide, $F_3NO$, of the structure

is described and claimed in copending application Ser. No. 179,521 of Fox, MacKenzie and Vanderkooi, Jr., filed Mar. 9, 1962.

We claim:
1. The process for making trifluoroamine oxide which comprises heating NOF and elemental fluorine, in a reaction zone, at temperatures not less than about 150° C. and while at pressure not less than about 2000 p.s.i.g. to effect reaction of NOF with fluorine to form trifluoroamine oxide.

2. The process of claim 1 in which temperature is substantially in the range of 150–450° C.

3. The process of claim 1 in which elemental fluorine is initially present in amount of at least 0.5 molecular proportion per mol of NOF.

4. The process for making trifluoroamine oxide which comprises heating NOF and elemental fluorine, in a reaction zone, at temperatures substantially in the range of 275–425° C. and while at pressures substantially in the range of 2500–6000 p.s.i.g. to effect reaction of NOF with fluorine to form trifluoroamine oxide.

5. The process for making trifluoroamine oxide which comprises introducing NOF and at least one molecular proportion of elemental fluorine into a reaction zone, heating the materials therein to temperatures substantially in the range of 275–425° C. and while at pressures substantially in the range of 2500–6000 p.s.i.g. to effect reaction of NOF with fluorine to form trifluoroamine oxide.

6. The process for making trifluoroamine oxide which comprises introducing NOF and about 2–6 molecular proportions of elemental fluorine into a reaction zone, heating the materials therein to temperatures substantially in the range of 300–400° C., and while at pressures substantially in the range of 4000–6000 p.s.i.g. to effect reaction of NOF with fluorine to form trifluoroamine oxide.

References Cited
UNITED STATES PATENTS 3,032,400   5/1962   Marsh _____ 23—203
3,043,662   7/1962   Lipscomb _____ 23—203

MILTON WEISSMAN, *Primary Examiner.*

CARL D. QUARFORTH, *Examiner.*

J. D. VOIGHT, *Assistant Examiner.*